United States Patent [19]

Murphy

[11] Patent Number: 5,110,398

[45] Date of Patent: * May 5, 1992

[54] MACHINE FOR APPLYING HEAT WELDS OR SOLVENT WELDS TO ROOF MEMBRANES

[75] Inventor: Colin R. R. Murphy, Morristown, N.J.

[73] Assignee: Engineered Construction Components (America), Inc., Panama City, Panama

[*] Notice: The portion of the term of this patent subsequent to May 30, 2006 has been disclaimed.

[21] Appl. No.: 505,142

[22] Filed: Apr. 5, 1990

[51] Int. Cl.⁵ .............................................. B32B 31/00
[52] U.S. Cl. .................................. 156/499; 156/575
[58] Field of Search .............. 156/575, 579, 499, 578, 156/497, 574, 583.1, 152, 157, 320, 544, 82, 339

[56] References Cited

U.S. PATENT DOCUMENTS

| | | | |
|---|---|---|---|
| 3,057,766 | 10/1962 | Dickey | 156/82 |
| 4,504,352 | 3/1985 | Meyer | 156/499 |
| 4,602,978 | 7/1986 | Eckstein | 156/578 |
| 4,834,828 | 5/1984 | Murphy | 156/497 |
| 4,855,004 | 8/1989 | Chitjian | 156/578 |

Primary Examiner—David A. Simmons
Assistant Examiner—Robert Barker
Attorney, Agent, or Firm—Elliot M. Olstein; Raymond J. Lillie

[57] ABSTRACT

A device for welding roof membranes which includes a heat welding means capable of applying a heat weld to overlapping roof membranes, and a fluid application means capable of applying a solvent or primer between overlapping roof membranes in order to form a solvent weld to the roof membranes or to aid in preparing the membranes for application of a heat weld to the membranes. The device may be employed to apply, for example, a heat weld to overlapping roof membranes on one side of a fastening means, and a solvent weld to the overlapping roof membranes on the opposite side of the fastening means. Such a device enables one to apply solvent or primer safely while providing the ability to apply, if desired, a heat weld in addition to the application solvent or primer.

5 Claims, 3 Drawing Sheets

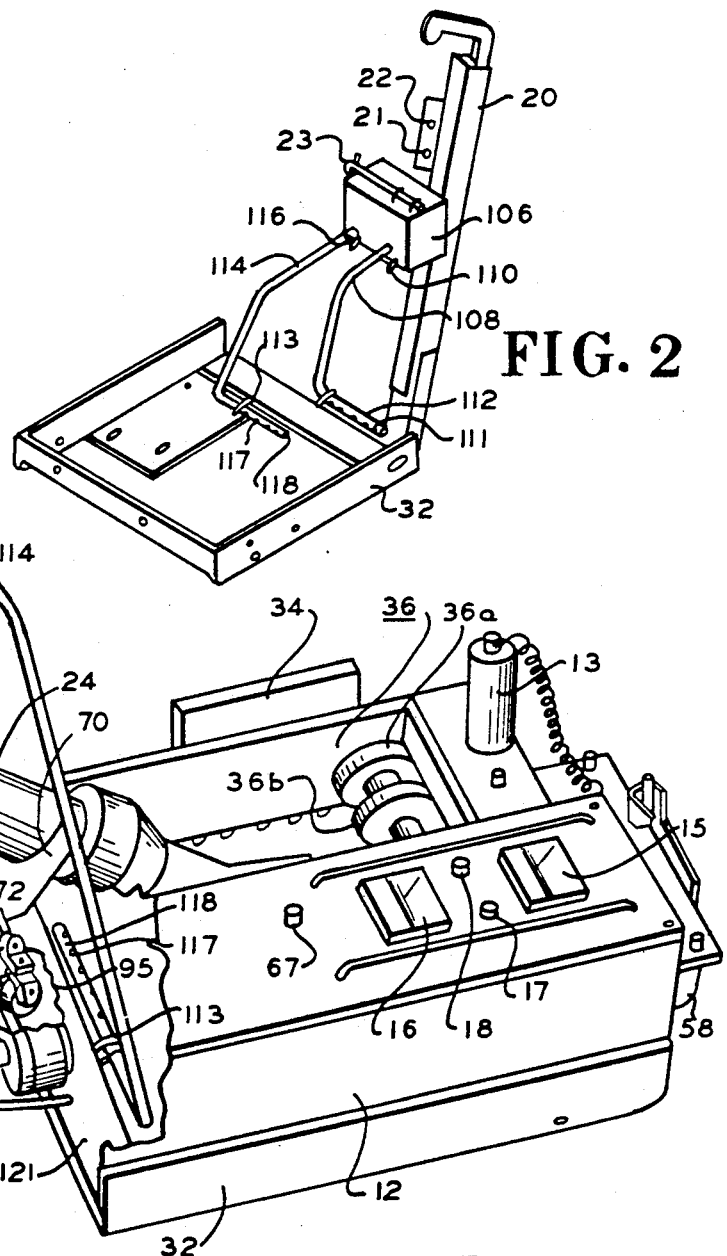
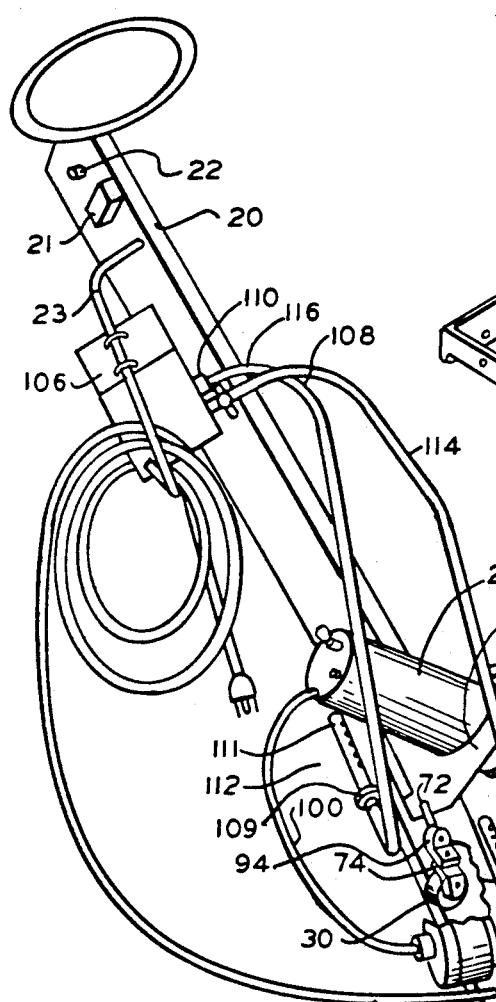
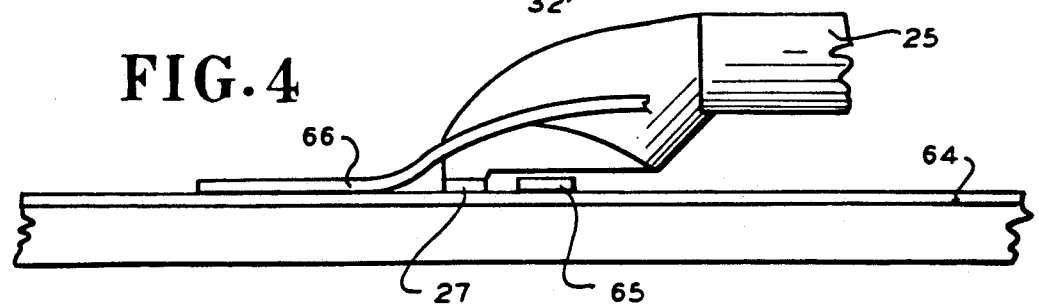

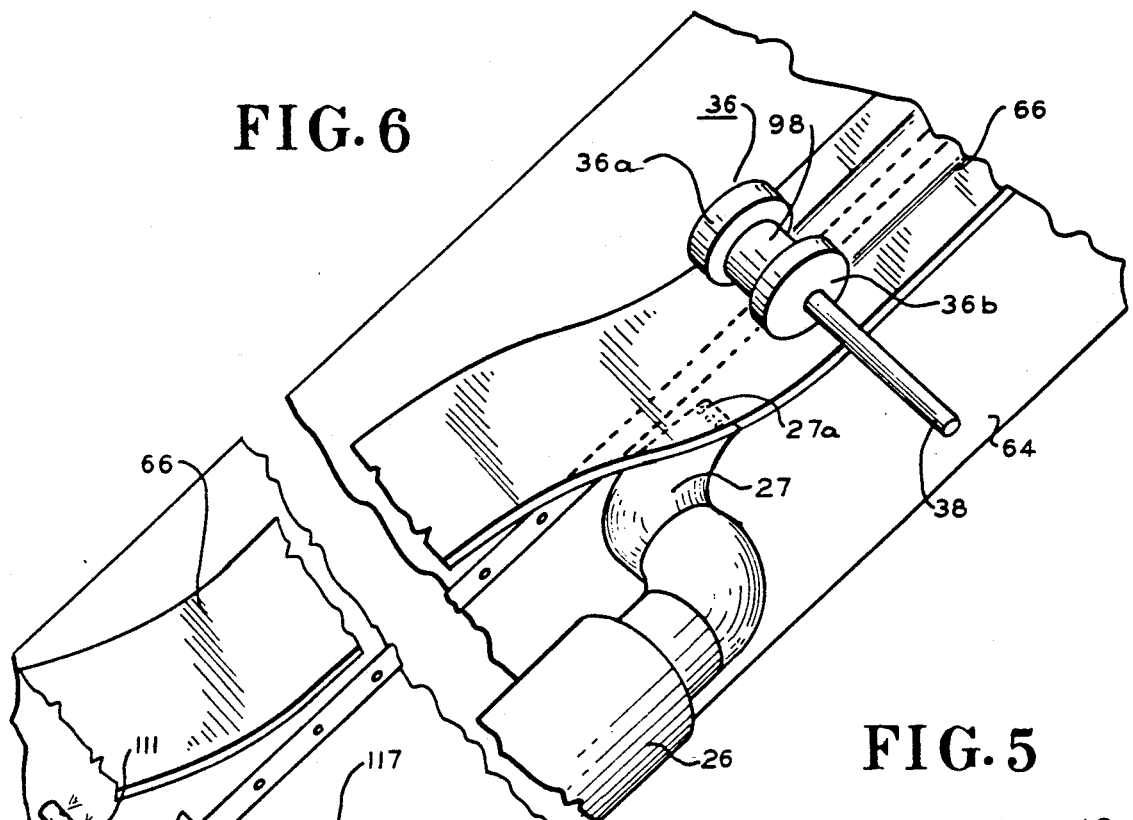
FIG. 6
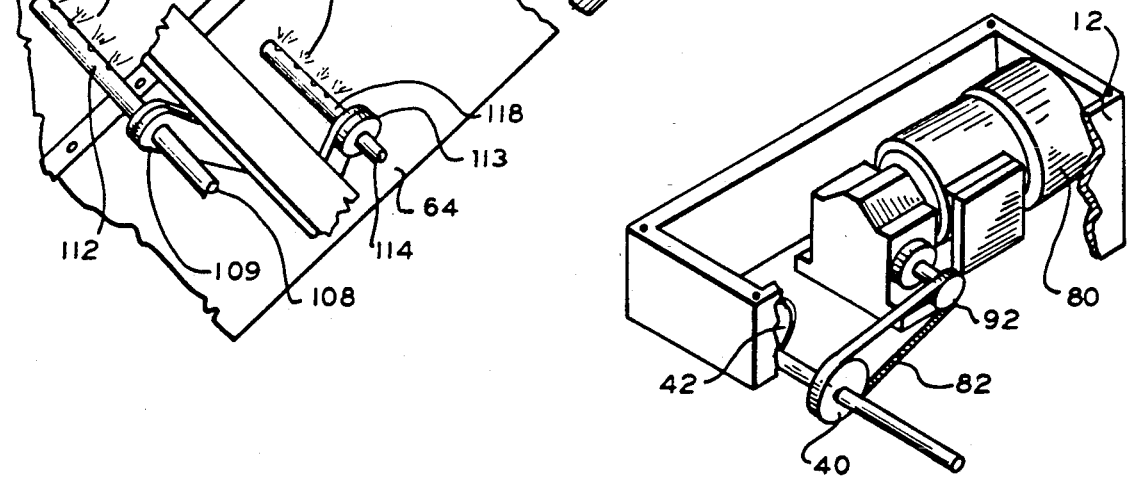
FIG. 5
FIG. 7
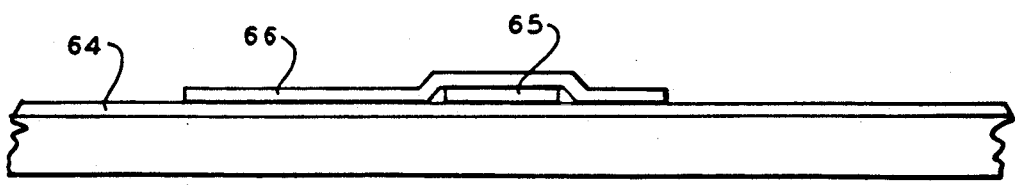

MACHINE FOR APPLYING HEAT WELDS OR SOLVENT WELDS TO ROOF MEMBRANES

This invention relates to a machine for applying welds to roof membranes. More particularly, this invention relates to a machine which is capable of applying heat welds and/or solvent welds to the overlapping portions of two overlapping roof membranes.

In a typical process for laying membranes on a roof deck, a first membrane is laid on a portion of the roof deck. In most processes, a fastening means such as a batten bar or line of stress plates, is placed near the edge of the membrane. The fastening means is parallel to the edge and runs parallel to the edge for the entire length of the edge. The fastening means is secured to the roof membrane by inserting fasteners through the fastening means, the membrane, and into or through the roof deck. Then another membrane is laid on the roof deck. A small portion of the second membrane overlaps the area where the fastening means was fastened to the first membrane. The overlapping edge area of the second membrane overlaps an area of the first membrane on both sides of the fastening means. Depending upon the composition of the roof membranes, solvent or primer and/or heat may be applied between the membranes on one side of the fastening means to form a weld on one side of the fastening means, and solvent or primer and/or heat may then be applied on the other side of the fastening means to form a weld on the other side of the fastening means. The result is a fusion of the two membranes on both sides of the fastening means, which provides a secure weld of the membranes. Heat welds, when such welds are applied, may be applied by a welding tool having a heating element which forms a weld by heat sealing the membranes. Solvent may be applied between the overlapping membranes by "painting" the solvent or primer between the membranes with a brush, or by applying the solvent between the membranes with a device having a tube, nozzle, or other application means. The solvent or primer serves to dissolve partially and/or soften the portion of the membranes which it contacts, thus enabling the membranes to be welded to each other, or to prepare the membranes properly for a heat weld.

As stated above, whether solvent and/or heat is applied to the overlapping roof membranes depends mostly upon the composition of the membranes. Some membranes are made of materials which render them unable to be welded by heat welds because such membranes burn and/or char immediately upon the application of heat to the membranes. Such membranes can be welded only through the application of solvent or primer. Certain membranes can withstand the application of heat only after the membrane has been prepared with an application of solvent or primer prior to the application of heat. There are also membranes which may be heat welded without the application of solvent or primer, and thus, in some cases, one may wish to apply a heat weld without the application of solvent or primer. In some cases, one may wish to apply a heat weld to the membranes on one side of a fastening means to form a heat weld, and solvent or primer on the other side of a fastening means to form a solvent weld.

When certain solvents, such as methyl ethyl ketone or tetrahydrofuran, are applied with brushes or other applicating means which require the face of the user to be near the applied solvent, the user is most likely to inhale the toxic fumes of the solvent, or solvent could accidentally contact the skin or eyes of the user, which may result in various hazards to the health of the user.

Also, in cases where solvent and heat are applied to overlapping roof membranes, the solvent is applied first with a brush or other application means, as hereinabove described, and then heat welds are applied with a separate device for applying heat welds. Although such solvent and heat welding operations are desirable for certain types of roof membranes, such a process can consume a considerable amount of time.

It is an object of the present invention to provide a device which is capable of applying heat welds and solvent welds to roof membranes.

It is also an object of the present invention to provide a device which can apply heat welds and solvent welds to roof membranes without being hazardous to the user when solvent welds are applied.

In accordance with an aspect of the present invention, there is provided a device for welding roof membranes which comprises a chassis, a means for movably supporting the chassis, a heat welding means capable of heat welding two overlapping roof membranes to each other, fluid application means capable of applying a solvent or a primer between overlapping roof membranes, and means for applying pressure to welded overlapping roof membranes. The means for applying pressure is attached to the chassis rearward of the heat welding means relative to the direction of movement of the device to provide thereby pressure to the welded roof membranes. The heat welding means is attached to the chassis, and is capable of applying at least one heat weld to the roof membranes, wherein the heat welding means includes at least one directing means for directing heat between the roof membranes. In a preferred embodiment, the heat welding means further comprises a blower, a heating element, and a holder for the heating element. The heating element is contained within the holder, and the heating element and the holder are located in front of the blower and behind the at least one directing means, whereby the blower directs a gas to the heating element, whereby the gas is heated, and is subsequently directed to the at least one directing means.

The fluid application means includes at least one fluid directing means for directing solvent or primer between overlapping roof membranes in order to form a solvent weld of the roof membranes and/or to aid in preparing the membranes for application of a heat weld to the roof membranes. The fluid application means is positioned forward of the heat welding means relative to the direction of movement of the device. The fluid application means may, in a preferred embodiment, further comprise at least one reservoir means for containing solvent or primer, at least one conduit means for connecting the at least one reservoir means to the at least one fluid directing means, at least one valve means for controlling the flow of solvent or primer from the at least one reservoir means to the at least one fluid directing means, and at least one holder for holding the at least one fluid directing means. The at least one fluid directing means is movable within the holder. The holder is attached to the chassis.

The means for applying pressure to the welded overlapping roof membranes, in one embodiment, comprises at least one weld wheel, and preferably further comprises at least one weighted wheel located behind the weld wheel relative to the direction of movement of the device.

The device, in a further embodiment, further comprises a motor, a housing for the motor, said housing being mounted to the chassis, and a handle portion. The handle portion includes means for the starting and stopping of the motor, and means for controlling the speed of the motor.

In accordance with another embodiment, the device further comprises means for detecting the temperature of at least one heat weld. The means for detecting temperature comprises an infrared sensor, a holder for the infrared sensor, and a temperature readout meter connected to the infrared sensor.

In accordance with another aspect of the present invention, there is provided a device for welding overlapping roof membranes, wherein a fastening means is located between overlapping roof membranes, which comprises a chassis, means for movably supporting the chassis, and heat welding means capable of heat welding two overlapping roof membranes to each other. The heat welding means is capable of applying a heat weld to the roof membranes on at least one side adjacent to the fastening means. The heat welding means includes at least one heat directing means for directing heat to form a weld on at least one side of and adjacent to the fastening means. The device also includes fluid application means capable of applying a solvent and/or a primer between the overlapping roof membranes on at least one side of and adjacent to the fastening means. The fluid application means includes at least one fluid directing means for directing the solvent or primer between the overlapping roof membranes to form a solvent weld on at least one side of and adjacent to the fastening means, and/or to aid in preparing the membranes for application of a heat weld on at least one side of and adjacent to the fastening means. The fluid application means is positioned forward of the heat welding means relative to the direction of movement of the device. The device also includes means for applying pressure to welded overlapping roof membrane portions on opposite sides of and adjacent to the fastening means between the overlapping roof membrane portions. The means for applying pressure is positioned rearward of the heat welding means relative to the direction of movement of the device to provide thereby pressure to the welded roof membrane portions.

In one embodiment, the means for applying pressure to the welded overlapping roof membranes comprises a pair of weighted wheels, wherein each of the weighted wheels is capable of being positioned on opposite sides of a fastening means between overlapping membranes. In another embodiment, the means for applying pressure to welded overlapping roof membranes comprises a weld wheel, which is capable of being positioned over an upper membrane of the overlapping roof membranes, on at least one side of the fastening means. Preferably, the weld wheel is a bifurcated weld wheel having a groove dividing the weld wheel into first and second portions. The weld wheel is capable of being positioned over a portion of an upper membrane of the overlapping membranes. The first and second portions are positioned on opposite sides of a fastening means between overlapping membranes. In a preferred embodiment, the means for applying pressure to welded overlapping roof membranes includes both the pair of weighted wheels and the weld wheel as hereinabove described. In such an embodiment, the weld wheel is located in front of the weighted wheels relative to the direction of movement of the device.

In accordance with a preferred embodiment, the fluid application means includes a first fluid directing means for directing solvent or primer on one side of a fastening means, and a second fluid directing means for directing solvent or primer to another side of the fastening means. Most preferably, the fluid application means further comprises at least one reservoir means for containing solvent or primer, first and second conduit means for connecting the at least one reservoir means to the first and second fluid directing means, and first and second valve means for controlling the flow of solvent or primer from said at least one reservoir means to said first and second fluid directing means. The fluid directing means also further comprises first and second holders for holding the first and second fluid directing means. The first and second holders are attached to the chassis.

In accordance with a further embodiment, the heat welding means may further comprise a blower, a heating element, and a holder for the heating element as hereinabove described.

In accordance with yet another embodiment, the device may further comprise a motor, a housing for the motor, and a handle portion which includes means for starting and stopping the motor and means for controlling the speed of the motor, also as hereinabove described.

In accordance with another embodiment, the device further comprises, as hereinabove described, means for detecting the temperature of the heat welds. The means for detecting temperature comprises, an infrared sensor, a holder for the infrared sensor, and a temperature readout meter connected to the infrared sensor.

The invention will now be described with respect to the drawings, wherein:

FIG. 2 is a left isometric view of the chassis and handle portion of the device which depicts the relationship of the solvent welding means to the chassis and the handle portion;

FIG. 3 is a right isometric view of the device shown in FIG. 1, with portions of the heat welding means and motor housing broken away to depict the solvent directing means;

FIG. 4 is a front view of the nozzle of the heat welding means as it applies a weld between two overlapping roof membranes on one side of a batten bar;

FIG. 5 is a cut-away view of the motor of the device, said motor being contained within a housing;

FIG. 6 is an elevated breakaway view of the heat welding means, the weld wheel, and the solvent directing means as heat and solvent welds are being applied to two overlapping roof membranes; and FIG. 7 is a cut-away view of two welded roof membranes after welds were applied to the membranes on both sides of a fastening means.

Figure 1:
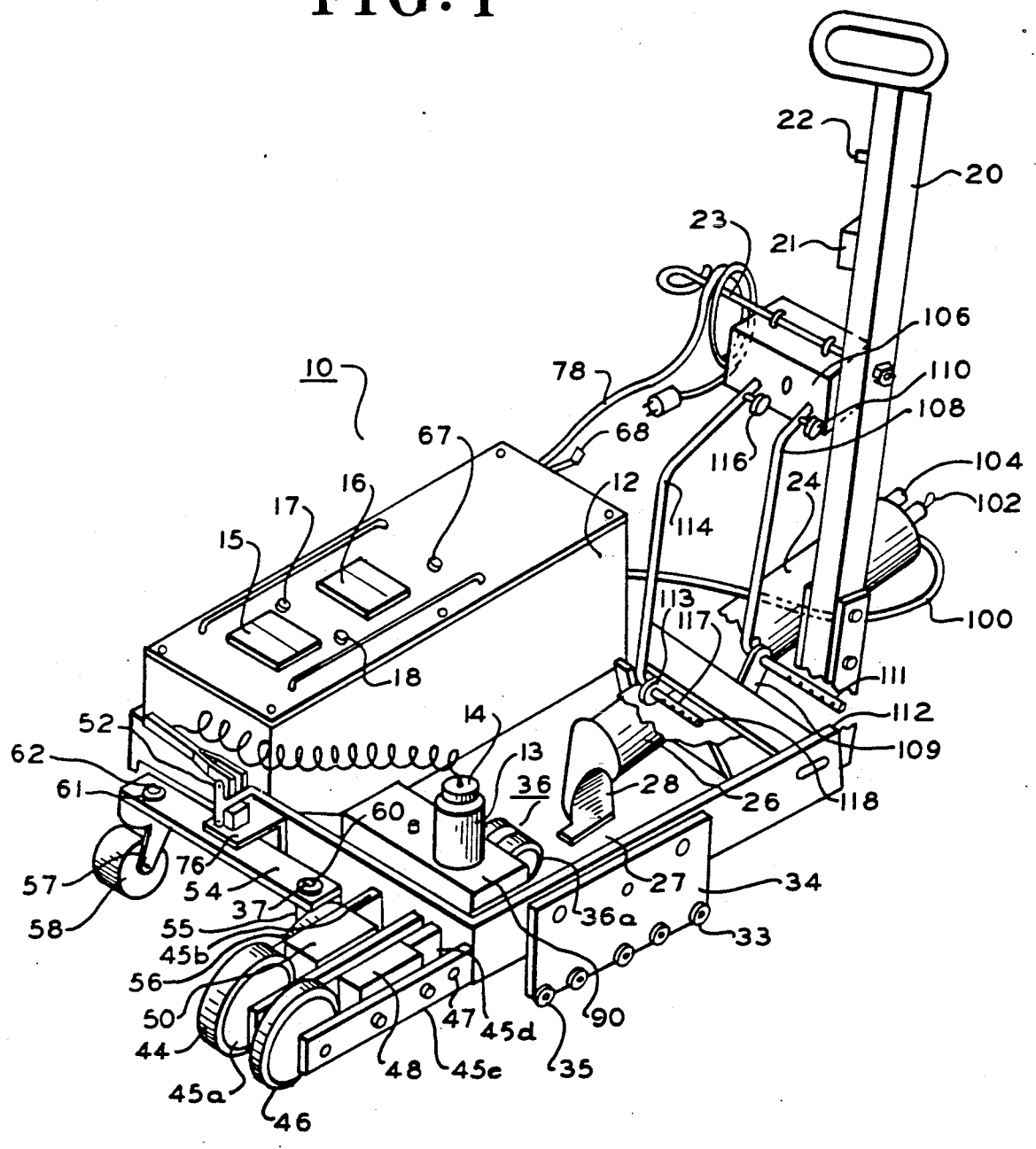
FIG. 1 is a left isometric view of an embodiment of the device of the present invention, with a portion of the heat welding means broken away to depict the solvent directing means.

Referring now to the drawings, the welding device 10 of the present invention has a handle assembly 20 which includes a holder 23 for a cord and a solvent tank, a start/stop switch 21, and a speed control knob 22 for a walker motor 80 contained in a motor housing 12. The motor 80, as well as the entire device 10, is activated by power switch 68 on housing 12. Next to the housing 12 is an infrared probe 14 contained in a probe holder 13. A weight set 90 may also be mounted on probe holder 13. The probe 14 is electronically connected to a temperature readout meter 15 mounted on the top of said housing 12. Also mounted on the top of said housing 12 is a voltage meter 16, a high voltage indicator 17, a low voltage indicator 18, and a reset knob 67. The motor housing 12 may also contain an electrical control and monitoring system, which, in one embodiment, may comprise a white box, a control means, and a circuit board (not shown) which insure that the proper amount of current is supplied to the device 10. The electrical control and monitoring system is connected to the temperature readout meter 15, voltage meter 16, and voltage indicators 17 and 18. The electrical control and monitoring system also controls the motor 80, and the welding means. The housing 12, handle assembly 20, and probe holder 13 are each mounted to the chassis 32.

Also mounted to chassis 32 is a heat welding tool comprising a blower 24, a heating element 26 contained within a heating element holder 25, and a nozzle 28 which transfers heat from heating element 26, thereby applying heat welds to the roof membranes. The welding tool has a cord 100 which connects blower 24 to motor housing 12. The blower 24 has a switch 102 which activates the blower 24. The amount of heat emitted by heating element 26 is controlled by control means 104, which may be a thermostat, rheostat, or a potentiometer. A preferred heating element comprises a coil enclosed within a ceramic material, and has a wattage of about 3,000 watts. The welding tool is attached to the chassis 32 by means of a welder cradle 70 for holding the tool, an axle 72, and axle bushings (not shown) disposed within said cradle 70, and an axle bracket 94 bolted by screw 95 to said chassis 32.

Nozzle 28 includes an outlet 27 having openings 27a. Outlet 27 transfers or directs a gas such as air heated by heating element 26 through openings 27a, against the roof membranes on one side of a fastening means, thus applying a heat weld to the roof membranes.

Suspended from holder 23 is a solvent tank 106, which contains a solvent or primer. Extending from tank 106 are conduits 108 and 114. Connected to the lower end of conduit 108 is a fluid directing means in the form of a nozzle 112. Nozzle 112 has openings 111, through which a solvent or a primer is directed between overlapping roof membranes. Nozzle 12 is contained and slidable within a holder or bracket 109, which is attached to chassis 32. Connected to the lower end of conduit 114 is a second fluid directing means in the form of nozzle 118, which has openings 117 for directing a solvent or primer between overlapping roof membranes. Nozzle 118 is contained and slidable within a holder or bracket 113, which like bracket 109, is attached to chassis 32.

Attached to conduit 108 is valve 110, which controls the flow of solvent or primer through conduit 108 to nozzle 112, and attached to conduit 114 is valve 116, which controls the flow of solvent or primer through conduit 114 to nozzle 118. In this manner, the flow of solvent or primer through one conduit may be controlled independently of the flow of solvent or primer through the other conduit, and the desired amount of solvent or primer may be delivered through each nozzle. Solvents which may be employed include methyl ethyl ketone and tetrahydrofuran.

It is also to be noted that nozzles 112 and 118 are attached to chassis 32 by brackets 109 and 113, respectively, at different points on chassis 32. It is also contemplated that nozzles 112 and 118 may be of different lengths. Such arrangements of the nozzles 112 and 118 enable the nozzles 112 and 118 to deliver solvent or primer between overlapping roof membranes on opposite sides of a fastening means.

To prevent combustion of the solvent or primer, outlet 27 of the heat welding means should be spaced at least 12 inches from nozzles 112 and 118.

It is to be understood, however, that the scope of the present invention is not to be limited to the specific heat welding means and solvent or primer delivery means hereinabove described. For example, in one alternative (not shown), one conduit may be attached to a tank containing solvent and the other conduit may be attached to a tank containing a primer, whereby solvent is applied between the roof membranes on one side of the fastening means, and primer is applied between the roof membranes on the opposite side of the fastening means. Thus, a solvent weld may be made on one side of the fastening means, and the portion of the membranes on the opposite side of the fastening means may be prepared for the application of a heat weld through the application of a primer.

In another alternative, the nozzle of the heat welding device may have two outlets, whereby each outlet has openings and directs a heated gas such as air to opposite sides of the fastening means. In this manner, a heat weld may be applied to both sides of a fastening means. An example of such as nozzle having two outlets is described in U.S. Pat. No. 4,834,828.

Connected near the front of the chassis 32 is an axle 38 upon which is mounted a weld wheel 36, axle gear 40, and drive wheel 42. The axle may be mounted to chassis 32 by bushings (not shown). Axle gear 40 is connected to the motor 80 by a driving means such as a drive belt 82 which is connected to a drive gear 92 of motor 80. The drive wheel 42 is located under the motor housing 12. Weld wheel 36 is located in front of the outlets 27 of nozzle 28 and helps to press the two membranes being welded firmly against the roof deck and against each other after heat and/or solvent welds have been applied. Weld wheel 36 has a groove 98 which bifurcates the wheel into two portions 36a, 36b. In a preferred embodiment, weld wheel 36 is located 1/32 inch away from the end of outlet 27. As a further aid in keeping a such pressure on the roof membranes as possible, a weight 34 is affixed to one side of chassis 32. Wheels 33, 35 are bolted to weight 34 by screws or other bolting means.

Wheels are provided at the front and rear of the chassis 32 in order to move the welding device 10 along a roof membrane. At the rear of the chassis 32 is a wheel 30 mounted to chassis 32 by means of a bracket 74. In front of the chassis is a riser assembly mechanism comprising a lever 52 which is screwably inserted into a bracket 76 and a plate 54. Depending from plate 54 are rise wheels 56, 58, mounted to plate 54 by bracket 55, screw 60, and nut 59, and by bracket 57, screw 62, and nut 61, respectively. The riser assembly mechanism is mounted to chassis 32 by means of bracket 76.

Also connected to the front of the chassis 32 is a stitcher wheel assembly, also located in front of weld wheel 36, which comprises a wide stitcher wheel 44 and a narrow stitcher wheel 46. It is also contemplated that the stitcher wheels may be of the same size. Mounted to wide stitcher wheel 44 are brackets 45a, 45b and mounted to narrow stitcher wheel 46 are brackets 45c, 45d. Stitcher wheel axle 47 connects bracket 45a, 45b, 45c, 45d and serves to mount the stitcher wheel assembly to chassis 32. Mounted between brackets 45a, 45b is weight 50, and mounted between brackets 45c, 45d is weight 48. Weights 48, 50 aid in keeping stitcher wheels 44, 46 firmly pressing against the roof membranes after the welds have been applied. This helps to eliminate any "bubbling" or air pockets under the membranes and to maintain alignment of the welding seams after the welds are applied as well as proper alignment of the roof membranes.

The welding process using the device 10 is carried out by laying a first lower membrane 64 on top of a roof deck or other roofing structure. A batten bar 65 is fastened to membrane 64 and to the roof deck by any fastening means known in the art. The batten bar 65 is fastened near and parallel to an edge of membrane 64 for the entire length of the edge, but does not touch the edge of membrane 64. As an alternative fastening means, a line of stress plates (not shown) may be employed. A second upper membrane 66 is laid over first lower membrane 64 so as to overlap portions of membrane 64 on both sides of batten bar 65. After the two membranes have been laid in the above overlapping positions, nozzles 112 and 118 are adjusted within brackets 109 and 113 respectively, such that nozzle 112 will deliver solvent or primer between the overlapping membranes 64 and 66 on one side of the batten bar 65, and nozzle 118 will deliver solvent or primer between overlapping membranes 64 and 66 on the other side of the batten bar 65, if desired. The solvent or primer may dissolve partially or soften a portion of the membranes when applied, thus making the membranes amenable to being welded to each other. Valves 110 and 116 are then adjusted such that a desired amount of solvent or primer flows out of nozzles 112 and 118, through opening 111 and 117, respectively. If one does not want solvent or primer to be applied between membranes 64 and 66 on one or both sides of batten bar 65, one merely keeps valve 110 and/or valve 116 in a closed position.

If one desires to apply a heat weld between membranes 64 and 66 on one side of batten bar 65, one positions nozzle 28 and outlet 27 of the welding tool between membranes 64 and 66 such that outlet 27 is on one side of batten bar 65. If one desires not to apply a heat weld, one leaves switch 102 of the heat welding tool in the off position, and may also position nozzle 28 and outlet 27 such that nozzle 28 and outlet 27 are not positioned between membranes 64 and 66. Such positioning may be accomplished by moving welding cradle 70 along axle 72.

Once solvent nozzles 112 and 118 and heat nozzle 28 and outlet 27 are properly positioned, nozzles 112 and 118, nozzle 28 and outlet 27 are run between membranes 64 and 66. Nozzles 112 and 118 transmit or direct solvent or primer through openings 111 and 117, respectively, to form solvent welds or to prepare the membranes 64 and 66 for application of a heat weld. Outlet 27 transmits or directs a heated gas such as air, heated by heating element 26, through openings 27a to form a heat weld on one side of batten bar 65. One may control the amount of heat being applied to the membranes by adjusting potentiometer 104 on blower 24 or by controlling the speed of motor 80 by turning speed control knob 22. Operation of the motor 80, which propels the device 10, at a fast speed causes less heat to be applied to the membranes, while operation of the motor at a slow speed will cause more heat to be applied to the membranes. The heat output from the nozzle 28, therefore, may be controlled by the speed at which the device 10, including the nozzle 28 and outlet 27, travels.

After the weld has been made and as the device 10 continues to move along the overlapping membranes, weld wheel 36 and then stitcher wheels 44, 46 move along the top surface of the upper second membrane 66 which has just been welded to the lower first membrane 64 at the points where the heat or solvent welds were just made. The two portions 36a, 36b of weld wheel 36, and then stitcher wheels 44, 46 in effect straddle the batten bar 65 as they run along the top surface of the upper second membrane 66. Groove 98 of weld wheel 36 rolls over the portion of upper second membrane 66 which lies directly over batten bar 65 while portions 36a, 36b of weld wheel 36 roll over portions of upper second membrane 66 on opposite sides of batten bar 65. The weld wheel 36 and the stitcher wheels 44, 46, which are aided by weights 48, 50 thereby help to eliminate air pockets and "bubbling" underneath the roof membranes. These wheels also help to maintain the newly formed weld seams in their proper positions, thus maintaining the overlapping portions of membranes 64, 66 in proper alignment.

In cases where a heat weld is being applied as the device 10 is being moved along the membranes 64, 66, the deck temperature of the weld being made by outlet 27 is given by temperature readout meter 15. The temperature is determined from the amount of heat sensed by infrared sensor 14. The infrared sensor 14 is located in front of weld wheel 36 and senses the "deck heat" after a weld has been made. In this way one can determine if welding is being done at the proper temperatures. Voltage of the device is indicted by voltage meter 16, and if the voltage is not proper, high voltage indicator 17 or low voltage indicator 18 will give a signal indicating that the device 10 is not operating at the proper voltage. A reset means 67 and a power switch 68 control power to the temperature sensing and voltage sensing mechanisms as well as to the the motor and the welding tool. If the device 10 is operating at too high or too low a voltage, the electrical control and monitoring system will turn off power for the entire device 10. After the power is turned off, one presses the reset switch 67 in order to reactivate the device.

In order to start the motor after turning on the power switch 68, one turns on the motor on/off switch 21 on handle assembly 20. The speed can be controlled by turning speed control knob 22, also located on handle assembly 20. One grips handle assembly 20 while walking the device 10 along the roof membranes.

Power can be supplied to the device by standard household electric current by means of cord 78, which is connected to the motor housing 12. When the device 10 is not in use, cord 78 can be wrapped around cord holder 23 for easy storage of the device 10.

Advantages of the present invention include the ability to apply solvent and/or heat welds to overlapping roof membranes with the same device. The device can be adapted and adjusted so as to apply one type of weld (solvent or heat) to overlapping membranes on one side of the fastening means, and to apply another type of weld on the opposite side of the fastening means.

It is to be understood that the device of the present invention as well as the welding processes using this device are not to be limited to the specific embodiments hereinabove described. The invention may be practiced other than as particularly described and still be within the scope of the accompanying claims.

What is claimed is:

1. A device for welding overlapping roof membranes, wherein a fastening means is located between the overlapping roof membranes, comprising:
   a chassis;
   means for movably supporting said chassis;
   heat welding means capable of heat welding two overlapping roof membranes to each other, said heat welding means capable of applying a heat weld to said roof membranes on at least one side adjacent to the fastening means, said heat welding means including at least one heat directing means for directing heat to form a heat weld on at least one side of and adjacent to the fastening means;
   fluid application means capable of applying a solvent and/or a primer between said overlapping roof membranes on at least one side of and adjacent to the fastening means, said fluid application means including at least one solvent directing means for directing said solvent or primer between said overlapping roof membranes to form a solvent weld on at least one side of and adjacent to a fastening means, and/or to aid in preparing said membranes for application of a heat weld on at least one side of and adjacent to the fastening means, said solvent welding means positioned forward of said heat welding means relative to the direction of movement of said device; and
   means for applying pressure to welded overlapping roof membrane portions on opposite sides of and adjacent to the fastening means between the overlapping roof membrane portions, said means for applying pressure positioned rearward of said heat welding means relative to the direction of movement of said device to provide thereby pressure to said welded roof membrane portions, said means for applying pressure to welded overlapping roof membranes comprising a pair of weighted wheels, each of said weighted wheels capable of being positioned on opposite sides of said fastening means, and a weld wheel located behind said heat welding means and in front of said weighted wheels relative to the direction of movement of said device, said weld wheel capable of being positioned over an upper membrane of said overlapping roof membranes, said weld wheel including a groove dividing said weld wheel into first and second portions, whereby said first and second portions are capable of being positoned on opposite sides of said fastening means.

2. The device of claim 1 wherein said heat welding means further comprising:
   a blower;
   a heating element; and
   a holder for said heating element, wherein said heating element is contained within said holder, said heating element and said holder being located in front of said blower and behind said at least one directing means, whereby said blower directs a gas to said heating element, whereby said gas is heated, and is subsequently directed to said at least one directing means.

3. The device of claim 1 wherein said fluid application means further comprises:
   at least one reservoir means for containing solvent or primer;
   first and second conduit means for connecting said at least one reservoir means to said first and second fluid;
   first and second valave means for controlling the flow of solvent or primer from said at least one reservoir means to said first and second directing means; and
   first and second holders for holding said first and second fluid directing means, said first and second holders being attached to said chassis.

4. The device of claim 1, and further comprising:
   a motor;
   a housing for said motor, said housing mounted to said chassis; and
   a handle portion, said handle portion including means for starting and stopping said motor and means for controlling the speed of said motor.

5. The device of claim 1, and further comprising means for detecting the temperature of said heat weld(s), said means for detecting temperature comprising:
   an infrared sensor;
   a holder for said infrared sensor; and
   a temperature readout meter connected to said infrared sensor.

* * * * *